United States Patent [19]

Ryoke et al.

[11] Patent Number: 5,196,265

[45] Date of Patent: Mar. 23, 1993

[54] MAGNETIC RECORDING MEDIUM

[75] Inventors: Katsumi Ryoke; Yutaka Kakuishi; Toshiyuki Kitahara, all of Kanagawa, Japan

[73] Assignee: Fuji Photo Film Co., Ltd., Kanagawa, Japan

[21] Appl. No.: 772,748

[22] Filed: Oct. 7, 1991

[30] Foreign Application Priority Data

Oct. 8, 1990 [JP] Japan .................................. 2-270156

[51] Int. Cl.$^5$ ...................... B32B 27/06; G11B 23/00
[52] U.S. Cl. .................................. 428/332; 428/480; 428/678; 428/679; 428/694; 428/900
[58] Field of Search ............... 428/480, 141, 694, 900, 428/332, 678, 679

[56] References Cited

U.S. PATENT DOCUMENTS

| | | | |
|---|---|---|---|
| 4,614,687 | 9/1986 | Nishimatsu et al. ................ | 428/694 |
| 4,710,421 | 12/1987 | Ono et al. ........................... | 428/480 |
| 4,720,412 | 1/1988 | Katoh et al. ........................ | 428/480 |
| 4,804,736 | 2/1989 | Utsumi ................................ | 428/480 |
| 5,051,292 | 9/1991 | Katoh et al. ........................ | 428/480 |
| 5,055,349 | 10/1991 | Yasufuku et al. ................... | 428/694 |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A magnetic recording medium comprising a non-magnetic support having thereon a magnetic layer containing a ferromagnetic powder and a binder, the non-magnetic support comprising polyethylene naphthalate in which Young's modulus in the transversal direction is at least 700 kg/mm$^2$ and Young's modulus in the mechanical direction is less than 800 kg/mm$^2$, the ferromagnetic powder being magnetic metal powder, and the total thickness of the magnetic recording material being not more than 11 μm.

5 Claims, No Drawings

MAGNETIC RECORDING MEDIUM

FIELD OF THE INVENTION

The present invention relates to a magnetic recording medium comprising a non-magnetic support and a magnetic layer provided thereon, and more particularly to a magnetic recording medium using a film of polyethylene naphthalate (hereinafter referred to as "PEN") as the non-magnetic support.

BACKGROUND OF THE INVENTION

A biaxially oriented polyethylene terephthalate (hereinafter referred to as "PET") film has heretofore been widely used as a support in a magnetic recording medium because of its good surface smoothness and mechanical characteristics, and a magnetic recording medium using it as the support is excellent in abrasion resistance and running properties. In recent years, high density recording and long time recording have been increasingly required for video tape using a polyester support. Accordingly, an increasing demand exists for the support to possess excellent smoothness and sliding properties, and further to be thin in thickness yet demonstrate high strength and excellent running durability.

In order to meet the above requirements, use of a PET support, which is increased in strength in both longitudinal and width directions, has been made. However, with a reduction in the thickness of the conventional PET support, the strength of the support becomes insufficient and thus deformation or damage of a tape edge during running system occurs, seriously deteriorating recording and reproducing characteristics.

In order to increase the strength while decreasing the thickness of a support tape, JP-A-62-234233 (the term "JP-A" as used herein means an "unexamined published Japanese patent application) discloses the use of polyamide, and EP-A-229346 discloses the use of PEN. The support made of polyamide or PEN is increased in strength because of strong internal orientation of the material, but the tear transmission resistance of the support is seriously low because of its strong internal orientation. For this reason, at steps of coating, calendering and slitting of the magnetic recording material, cutting often occurs and the yield is seriously decreased. Even though the magnetic recording material can be fabricated into the desired tape, if the tape is damaged, even though slightly, as a result of troubles in the running system, the tape is easily cut, which will become a serious problem for the quality of the product.

JP-A-63-197643 and 63-212549 disclose composite polyester. If, however, a proper lamination ratio is not employed, a serious reduction in tear transmission resistance and insufficient strength are produced by the strong internal orientation as in the above case. Thus, as steps of coating, calendering and slitting of the magnetic recording material, cutting is often caused, leasing to a considerable reduction in the yield, and furthermore the deformation or damage of the tape edge in the tape running system is caused, leading to a serious deterioration of recording and reproducing characteristics.

JP-A-63-197643 discloses a composite polyester film, which is a three layer composite film composed of biaxially oriented polyethylene-2,6-naphthalene carboxylate films as outer layers and a biaxially oriented polyethylene terephthalate film as a core layer as sandwiched between the two outer layers, and in which the thickness of the two outer layers is 1/40 to 1/5 of the total film thickness.

In the above composite polyester film, it is attempted to prevent deposition of oligomer crystals which are responsible for dropout, by employing the above construction. However, in the conventional balanced type, if the above construction is employed, the strength in the longitudinal direction (lengthwise direction) and the strength in the width direction (lateral direction) are not sufficiently high and edge deformation is caused, leasing to a considerable decrease of output.

Although PEN is known as a material of very high strength, its tear strength in the lateral direction (width direction) is small and is not at the level that can be employed for practical use.

SUMMARY OF THE INVENTION

An object of the present invention is to provide a magnetic recording medium which is improved in smoothness of output wave form and is high in output and durability.

Other objects and effects of the present invention will be apparent from the following description.

As a result of investigations to use PEN giving attention on its high strength, it has been found that if PEN of the balance type is employed, even though the total thickness is not more than 11 $\mu$m, the strength is sufficiently high, and there is not problem in connection with the tear strength.

The present invention relates to a magnetic recording medium comprising a non-magnetic support having thereon a magnetic layer containing a ferromagnetic powder and a binder, the non-magnetic support comprising polyethylene naphthalate in which Young's modulus in the transversal direction (width or lateral direction and hereinafter referred to as "TD") is at least 700 kg/mm$^2$ and Young's modulus in the mechanical direction (longitudinal or lengthwise direction and hereinafter referred to as "MD") is less than 800 kg/mm$^2$, the ferromagnetic powder being a magnetic metal powder, and the total thickness of the magnetic recording medium being not more than 11 $\mu$m.

DETAILED DESCRIPTION OF THE INVENTION

In a preferred embodiment of the present invention, the coercive force (Hc) of the magnetic recording medium is at least 1,400 Oe, and more preferably at least 1,500 Oe, the maximum flux density (Bm) of the magnetic recording medium is at least 2,700 gauss, and more preferably at least 3,000 gauss, the thickness of the non-magnetic support is in a range of 5 to 9 $\mu$m, and the surface roughness (Ra) of the non-magnetic support is less than 12 nm (cut off value: 0.25 mm).

In accordance with the present invention, it has been made possible to make the head touch of a thin tape equal to that of a thick tape by using a type of polyethylene naphthalate film which increases the strength in the width direction. In the conventional PET, when the film thickness is large, the output waveform envelop is 100% at both the input side and the output side, while on the other hand in the case of a thin tape, the strength is decreased; although it is 100% at the input side, it is only about 50% at the output side. It is also contemplated to use a certain type of PEN. It is generally known to use PEN which is strongly oriented in the longitudinal direction. Yet, as in the case of the conventional PET tape, the strength at the outlet side is only about 56%.

In accordance with the present invention, it has been unexpectedly found that if use is made of a tape of the balanced type in which orientation is effected in both the longitudinal direction and the width direction, that the decrease in output is about 80% even at the outlet side, and excellent smooth output evenness is attained. At the same time, the carrier/noise ratio (C/N) is also improved.

The present invention is particularly effective for a video tape to be used in VTR wherein the short wave recording wavelength of a magnetic recording medium is not more than 1 μm, particularly not more than 0.8 μm.

Heretofore, it has been very difficult to produce a thin tape which is not more than 25 μm in recording width, and which is to be used for digital recording for a long time recording.

In order to obtain good C/N, it is preferred to use a magnetic metal powder. Moreover, in order to obtain a good C/N, it is preferred that the coercive force (Hc) of the medium is at least 1,400 Oe, and more preferably at least 1,500 Oe, the maximum magnetic flux density (Bm) of the medium is at least 2,700 gauss, and more preferably at least 3,000 gauss, and the squareness ratio (SQ) (Br/Bm) of the medium is at least 0.86, and more preferably at least 0.87.

The center line average surface roughness (Ra) of the magnetic layer is preferably less than 12 nm, and more preferably not more than 11 nm (cut off value: 0.25 mm).

The Young's modulus in the TD of the non-magnetic support to be used is at least 700 kg/mm$^2$, and preferably 700 to 900 kg/mm$^2$, and the Young's modulus in the MD is less than 800 kg/mm$^2$, and preferably 600 kg/mm$^2$ or more and less than 800 kg/mm$^2$. The thickness of the support is preferably in a range of 5 to 9 μm, Ra of the support is preferably less than 12 nm.

For long time recording, it is essential that the total thickness of the medium is not more than 11 μm, and preferably from 6 to 11 μm.

The "total thickness of the medium" used herein refers to the total thickness of the magnetic recording medium, including the thickness of the support, the thickness of the magnetic layer, and if necessary, the dry thickness of the backing layer.

Preferred embodiments of the present invention are as follows:

(1) A magnetic recording medium comprising a magnetic layer containing magnetic metal powder, a backing layer, and a non-magnetic support, wherein the total thickness of the medium is not more 11 μm.

(2) A magnetic recording medium comprising a magnetic layer containing a magnetic metal powder, a backing layer, and a non-magnetic support, wherein the thickness of the non-magnetic support is in a range of 5 to 9 μm.

(3) A magnetic recording medium comprising a magnetic layer containing a magnetic metal powder, a backing layer, and a non-magnetic layer, wherein the center line surface roughness (Ra) of the magnetic layer is not more than 11 nm (cut off value: 0.25 mm).

Examples of the polyethylene naphthalate used in the present invention include polyethylene-2,6-naphthalene dicarboxylate, polyethylene-2,7-naphthalene dicarboxylate, polyethylene-2,5-naphthalene dicarboxylate, polyethylene-1,5-naphthalene dicarboxylate, polyethylene-1,6-naphthalene dicarboxylate and polyethylene-1,7-naphthalene dicarboxylate. Among these, polyethylene-2,6-naphthalene dicarboxylate is preferably used in the present invention.

The PEN that can be used in the present invention includes, for example, a polyethylene-2,6-naphthalene dicarboxylate homopolymer, a copolymer containing at least 70% by weight of an ethylene-2,6-naphthalene dicarboxylate repeating unit, and a polyester composition containing the above homopolymer or copolymer, and other various polymers to the extent that they do not significantly detract from the properties of PEN, for example, in such a proportion that the PEN component is at least 70% by weight. This PEN is a polymer having a film forming capability.

The PEN film can be produced by biaxially stretching an unstretched film. In accordance with the successive biaxial stretching method, for example, the first stage stretching is carried out at a temperature higher than the glass transition temperature (Tg) of PEN, preferably at (Tg+3) to (Tg+10)° C., and then at the same temperature as in the first stretching to at 10° C. higher temperature than the first stage stretching temperature, the second stage stretching is carried out. The stretching ratio is generally at least two times, preferably at least 2.5 times in the axial direction, and the surface area ratio is preferably at least 6 times and more preferably at least 8 times. The heat setting is preferably carried out under tension at a temperature of at least 170° C., preferably at least 190° C. The upper limit of the heat setting temperature is a temperature at which the film is held in a stable form, although it varies with the setting time. The heat setting time is preferably several seconds to several tens seconds and more preferably from 3 to 30 seconds. It is preferred that successive stretching is carried out to 1.05 to 2.5 times in the longitudinal direction and to 1.05 to 2.5 times in the lateral direction under temperature conditions of (Tg+10) to (Tm−40)° C. (Tm: melting temperature), and that re-heat setting is carried out at a temperature of (Tg+50) to (Tm−10)° C.

In this manner, a high strength polyester film can be obtained in which the Young's modulus in the longitudinal direction and the width direction are at least 600 kg/mm$^2$ and at least 690 kg/mm$^2$, respectively.

The polyethylene naphthalate can be produced by polycondensation of ethylene glycol and dimethyl 2,6-naphthalene dicarboxylate, for example. As the glycol, ethylene glycol and other like glycols can be used. As fillers, conventionally known fillers such as silica, calcium carbonate, and magnesium carbonate can be used. The filler may be concentrated on the one side of the film in the direction of thickness of the support. Commercial dimethyl 2,6-naphthalene-dicarboxylate produced by Mitsubishi Gas Chemical Co., Ltd. can be used. 2-Methyl-6-acylnaphthalene obtained by oxidation of 2,6-dimethylnaphthalene, oxidation of 2,6-dialkylnaphthalene, isomerization (Henckel method) of naphthalenedicarboxylic acid, or acylation of β-methylnaphthalene is oxidized by the use of a Co, Mn catalyst to obtain 2,6-naphthalenedicarboxylic acid. This is esterified to produce dimethyl 2,6-naphthalene dicarboxylate.

In general, a polycondensation product is extruded through a nozzle in a high temperature molten state and stretched in the MD and TD in a tenter according to the simultaneous biaxial stretching method. At one side or at both sides, an easy-adhesive layer may be provided.

The surface at each side may be made smooth (10 nm) or rough (20 to 40 nm).

As PEN has a higher Young's modulus than the conventional PET, it is relatively excellent in mechanical strength. However, if the thickness is made small, the stiffness of PEN film is inferior to that of PET film, and thus a suitable treatment is necessary. That is, in the present invention, in order to prevent envelope deformation in VTR due to insufficient stiffness, the balance of Young's modulus between the MD and TD is specified.

In the present invention, in order to improve sliding properties, a lubricant, for example, inorganic or organic inert fine particles or organic polymer inert fine particles, may be incorporated into PEN.

Inorganic inert fine particles which can be used include MgO, ZnO, MgCO$_3$, CaSO$_4$, BaSO$_4$, Al$_2$O$_3$, SiO$_2$, TiO$_2$, and C. Typical examples are silica titanium oxide, and alumina. Organic inert fine particles which can be used include sorbitan, sialoid, and cataloid. Organic inert fine particles which can be used include fine particles of tetrafluorethylene and polyethylene.

Addition of the above lubricants provides control over the surface form of the composite polyester film. For example, when the film is used in a coating type of magnetic recording medium, it is preferred that the center line surface roughness is made 0.007 to 0.03 $\mu$m, and when used in a metal thin film type of magnetic recording medium, particularly a vertical magnetic recording medium, it is preferred that the center line surface roughness is made not more than 0.007 $\mu$m when the cut-off value is 0.25 mm.

In the present invention, at least one magnetic layer contains ferromagnetic metal powder. The ferromagnetic metal powder preferably has a coercive force (Hc) of from 1,200 to 2,500 Oe and a crystallite size of from 100 to 300 Å, and preferably contains 60 to 90 wt % of Fe, 3 to 20 wt % of Ni, 1 to 10 wt % of Co, 0 to 5 wt % of Zn, 0 to 5 wt % of Si, 0 to 5 wt % of Al, and 1,000 ppm or less of Mn, Cu, Cr, Ca, Na, K, P, S and Se. The ferromagnetic metal powder preferably has a saturation magnetization (o$_s$) of from 90 to 250 emu/g and a specific surface area of from 30 to 100 m$^2$/g.

Binders which can be used in the present invention include the conventionally known thermoplastic resins, thermosetting resins, reactive resins, and mixtures thereof.

The thermoplastic resin preferably has a softening temperature of not more than 150° C., an average molecular weight of 10,000 to 300,000, and a degree of polymerization of about 50 to 1,000. Examples thereof include a vinyl chloride copolymer, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicon resin, a nitrocellulose-polyamide resin, a polyvinyl fluoride, a vinylidene chloride-acrylonitrile copolymer, a butadiene-acrylonitrile copolymer, a polyamide resin, a polyvinyl butyral, cellulose derivatives (e.g., cellulose acetate butyrate, cellulose diacetate, cellulose triacetate, cellulose propionate, and nitrocellulose), a styrene-butadiene copolymer, a polyester resin, a chlorovinyl ether-acrylate copolymer, an amino resin, various synthetic rubber-type thermoplastic resins, and mixtures thereof.

Preferred thermoplastic resins are those containing a polar group selected from the group consisting of polar groups represented by the following general formulae: —SO$_3$M, —OSO$_2$M, —SO$_3$M, —COOM, and

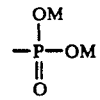

(where in M represents H, Li, Na, K or an alkyl group). A vinyl chloride copolymer containing the above polar group is particularly preferred.

The thermosetting resin or reactive resin preferably has a molecular weight of not more than 200,000 in the state of a coating composition, and when heated after coating and drying, its molecular weight becomes infinite as a result of reactions such as condensation and addition. Of these resins, those not undergoing softening or melting before thermal decomposition thereof are preferred. Representative examples are a phenol resin, an epoxy resin, a polyurethane hardening type resin, a urea resin, a melamine resin, an alkyd resin, a silicone resin, an acrylic reactive resin, an epoxy-polyamide resin, a nitrocellulose-melamine resin, a mixture of a high molecular weight polyester resin and an isocyanate prepolymer, a mixture of a methacrylic acid salt copolymer and a diisocyanate prepolymer, a mixture of polyester polyol and polyisocyanate, a urea-formaldehyde resin, a mixture of low molecular weight glycol, high molecular weight glycol and triphenylmethane triisocyanate, a polyamine resin, and mixtures thereof.

These binders are used singly or in admixture with each other, and other additives may be added thereto. In connection with the mixing ratio of the ferromagnetic fine powder and the binder, the binder is generally used in an amount in a range of 5 to 300 parts by weight per 100 parts by weight of the ferromagnetic fine powder.

As the additives, a dispersant, a lubricant, an abrasive, and the like can be added.

The polyisocyanate for use in the present invention include isocyanates such as trilenediisocyanate, 4,4,'-diphenylmethane diisocyanate, hexamethylene diisocyanate, xylilene diisocyanate, naphthylene-1,5-diisocyanate, o-toluidine diisocyanate, isophorone diisocyanate, and triphenylmethane triisocyanate, products of the above isocyanates and polyalcohol, and polyisocyanates formed by condensation of the above isocyanates can be used. These polyisocyanates are commercially available, for example, under the trade names of Coronate L, Coronate HL, Coronate 2030, Coronate 1031, Millionate MR, and Millionate MTL (produced by Nippon Polyurethane Co., Ltd.), Takenate D-102, Takenate D-110N, Takenate D-200, and Takenate D-202 (produced by Takeda Pharmaceutical Co., Ltd.), Desmodur L, Desmodur IL, Desmodur N, and Desmodur HL (produced by Sumitomo Bayer Co., Ltd.). These polyisocyanates can be used singly, and taking advantage of a difference in hardening reactivity, two or more thereof can be used in combination.

Dispersants which can be used in the present invention include metallic soaps comprising fatty acids having 10 to 22 carbon atoms (represented by R$_1$COOH (wherein R$_1$ is an alkyl group having 9 to 21 carbon atoms)) such as capric acid, caprylic acid, lauric acid, myristic acid, palmitic acid, stearic acid, oleic acid, elaidic acid, linoleic acid, linoleic acid, and stearic acid, and alkali metal (e.g., Li, Na, K) or alkaline earth metal (e.g., Mg, Ca, Ba), Cu, Pd, and the like salts of the above fatty acids. Also, lecithin can be used as the dispersant. In addition, higher alcohols having at least 10 carbon atoms, and their sulfuric acid esters or phosphoric acid esters can be used. The amount of the dispersant used is in the range of 0.05 to 20 parts by weight per 100 parts by weight of the binder. The dispersant may be previously deposited on the surface of the ferromagnetic fine powder or non-magnetic fine powder in advance, or may be added during the time of dispersing. This is described in, for example, JP-B-39-28369, JP-B-44-17945, JP-B-48-15001 (the term "JP-B" as used herein means an "examined published Japanese patent application"), and U.S. Pat. Nos. 3,387,993 and 3,470,021.

Lubricants which can be used in the present invention include silicone oil, graphite, molybdenum disulfide, boron nitride, fluorinated graphite, fluorinated alcohol, polyolefin (e.g., polyethylene wax), polyglycol (e.g., polyethylene oxide wax), alkylphosphoric acid ester, polyphenyl ether, tungusten disulfide, fatty acid esters comprising monobasic fatty acid having 10 to 20 carbon atoms and one or more selected from monohydric alcohols, dihydric alcohols, trihydric alcohols, tetrahydric alcohols, and hexahydric alcohols, having 3 to 12 carbon atoms, and fatty acid esters comprising monobasic fatty acid having at least 10 carbon atoms and monohydric to hexahydric alcohols, the total number of carbon atoms being 11 to 28. In addition, fatty acids having 8 to 22 carbon atoms, fatty acid amides, and aliphatic alcohols can be used. Representative examples of the organic compound lubricants are butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan stearate, anhydrosorbitan tetrastearate, oleyl alcohol, and lauryl alcohol. In addition, an additive for lubricating oil can be used, and an antioxidant (e.g., alkylphenol), a rust proofing agent (e.g., naphthenic acid, alkenylsuccinic acid, dilauryl phosphate), an oily agent (e.g., rapeseed oil, lauryl alcohol), a superpressure agent (e.g., dibenzyl sulfide, tricresyl phosphate, tributyl phosphite), a cleaning dispersant, a viscosity index increasing agent, a pouring point decreasing agent, a deforming agent, and the like can be used. The amount of the lubricant used is generally in the range of 0.05 to 20 parts by weight per 100 parts by weight of the binder.

Antistatic agents which can be used in the present invention include electrically conductive powders such as graphite, carbon black and carbon black graphite polymer; natural surfactants such as saponin; nonionic surfactants such as alkylene oxide-based surfactants, glycerine-based surfactants, glycidol-based surfactants, polyhydric alcohols, polyhydric alcohol esters, and alkylphenol EO (ethylene oxide) adducts; cationic surfactants such as higher alkylamines, cyclic amines, hydantoin derivatives, amideamines, esteramides, quaternary ammonium salts, heterocyclic compounds, e.g., pyridine, and phosphonium or sulfonium salts; anionic surfactants containing an acidic group, such as carboxylic acid, sulfonic acid, phosphoric acid, a sulfuric acid ester group, and a phosphoric acid ester group; amino acids; and amphoteric surfactants such as aminosulfonic acids, sulfuric acid or phosphoric acid esters of aminoalcohols, and alkylbetanine-type surfactants.

These surfactants can be used alone or in combination with each other. While the surfactants are used as the antistatic agents, they are sometimes used for other purposes, for example, for dispersion, improving magnetic characteristics, improving lubricity, or as coating aids.

Carbon black which can be used in the present invention include furnace carbon black for rubbers, thermal carbon black for rubbers, black for color, and acetylene black. Representative examples of abbreviated symbols of carbon black include SAF, ISAF, IISAF, T, HAF, SPF, FF, FEF, HMF, GPF, APF, SRF, MPF, ECF, SCF, CF, FT, MT, HCC, HCF, MCF, LFF, and RCF, which are classified in D-1765-82a of ASTM Standard in U.S.A. For the carbon black for use in the present invention, the average particle diameter is 10 to 1,000 nm (determined by the use of an electron microscope), the specific surface area (determined by the nitrogen adsorption method) is 1 to 800 m$^2$/g, the pH is 6 to 11 (determined according to the K-6221-1982 method of JIS Standards), and the DBP oil absorption amount (determined according to the K-6221-1982 method of JIS Standards) is 10 to 400 ml/100 g. In connection with the size of the carbon black for use in the present invention, 10 to 100 mn carbon black is used for the purpose of decreasing the surface electric resistance of a coating, and when the strength of the coating is intended to be controlled, 50 to 1,000 nm carbon black is used. For the purpose of controlling the surface roughness of the coating, fine carbon black (less than 100 nm) is used for making the surface smooth to decrease spacing loss. For the purpose of roughening the surface to decrease a coefficient of friction, coarse carbon black (at least 50 nm) is used. In this manner, the type and amount of carbon black are determined appropriately depending on the objects required for the magnetic recording medium. These carbon blacks may be used after surface treatment using a dispersant as described hereinafter, or after grafting with a resin. In addition, carbon black, wherein the surface of which has been partially made graphite by treating at a temperature of higher than 2,000° C. in the furnace for production thereof, can be used. In addition, as specific carbon black, hollow carbon black can be used. The amount of the carbon black used is generally 0.1 to 20 parts by weight per 100 parts by weight of the ferromagnetic fine powder in the case that it is used in the magnetic layer. Carbon black which can be used in the present invention can be referred to, for example, in *Carbon Black Binran* (Handbook of Carbon Black), published by Carbon Black Association, Japan in 1971.

Organic solvents which can be used for dispersion, kneading and coating in the present invention include ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, glycol acetate, and monoethyl ether; glycol ethers such as ether, glycol dimethyl ether, glycol monoethyl ether, and dioxane; tars (aromatic hydrocarbons) such as benzene, toluene, xylene, cresol, chlorobenzene, and styrene; chlorinated hydrocarbons such as methylene chloride, ethylene chloride, carbon tetrachloride, chloroform, ethylenechlorohydrin, and dichlorobenezene; N,N-dimethylformaldehyde, and hexane.

There are no special limitations on the method of kneading, and the order of adding the components can be determined appropriately. In preparation of the magnetic coating composition, the usual kneading machine, such as a two roll mill, a three roll mill, a ball mill, a pebble mill, a thoron mill, a sand grinder, a Szegvari attritor, a high speed impeller, a dispersing machine, a high speed stone mill, a high speed impact mill, a disper, a kneader, a high speed mixer, a ribbon blender, a cokneader, an intensive mixer, a tanbular, a blender, a disperser, a homogenizer, a monoscrew extruder, a twin screw extruder, and a supersonic dispersing machine, can be used. Details of the technology for kneading and dispersion are described in, for example, T. C. Patton, *Paint Flow and Pigment Dispersion*, published by John Wiley & Sons, 1964, and S. Tanaka, *Kogyo Zairyo* (Industrial Material), Vol. 25, 37 (1977). In addition, they are described in, for example, U.S. Pat. Nos. 2,581,414 and 2,855,156. In the present invention, the magnetic paint can be prepared by kneading and dispersing according to the methods described in the above literature.

In formation of the magnetic recording layer, the above components are combined in any desired formulation, dissolved and dispersed in an organic solvent, and the resulting coating composition is coated on the support. In the case that the medium is used in the form of a tape, the thickness of the support is preferably from 5 to 9 $\mu$m.

Prior to coating, the support may be subjected to treatments such as corona discharging treatment, plasma treatment, undercoating treatment, heat treatment, dust removing treatment, metal vapor depositior treatment, and alkali treatment.

For coating the above magnetic coating composition on the support, air doctor coating, blade coating, air knife coating, squeeze coating, impregnation coating, reverse roll coating, transfer roll coating, gravure coating, kiss coating, cast coating, and spray coating can be employed. In addition, other methods can be employed. Detailed explanation of the coating can be found in *Coating Kogaku* (Coating Engineering), published by Asakura Shoten, Japan, pp. 253-277, (published at March 20, 1971).

The magnetic coating composition coated on the support according by the aforementioned method is dried while subjecting to an orientation treatment, if necessary, to form a magnetic layer. At this treatment of coating and drying, the speed of conveying the support is generally from 10 to 500 m/min, and the drying temperature is generally within the range of 20° to 120° C. By applying surface smoothening treatment such as calender treatment, if necessary, and cutting into the desired form, the magnetic recording medium of the present invention is produced.

In the case of a thin tape as the magnetic recording medium, particularly a tape having a total thickness of not more than 11 $\mu$m, in order to improve the head touch of the VTR and obtain a high output, it is effective to provide a Young's modulus of the PEN support of at least 700 kg/mm$^2$ in the TD and less than 800 kg/mm$^2$ in the MD. This is markedly effective to provide high durability.

By using the support of the balanced type in which PEN is increased in strength in the width direction, even in the case of a thin tape, the output is less changed relative to the input side envelop wave form, and excellent output smoothness can be obtained. At the same time, in combination with the magnetic metal powder, the C/N is greatly improved.

The present invention is described in greater detail with reference to the following Example and Comparative Examples, but the present invention is not construed as being limited thereto. All parts used herein are by weight.

EXAMPLE 1 AND COMPARATIVE EXAMPLES 1 TO 3

The magnetic layer composition (I) shown below was placed in a kneader and thoroughly kneaded. Then the magnetic layer composition (II) shown below was introduced and mixed, and then the magnetic layer composition (III) as shown below was further introduced and dispersed to prepare a magnetic coating composition.

| Magnetic Layer Composition (I) | |
|---|---|
| Magnetic metal powder (Hc = 1600 Oe, $S_{BET}$ = 60 m$^2$/g, $\sigma_s$ = 130 emu/g) | 100 parts |
| Vinyl chloride resin (MR110, produced by Nippon Zeon Co., Ltd.) | 12 parts |
| Polyurethane resin (UR 8600, produced by Toyo Boseki Co., Ltd.) | 3 parts |
| Dispersant: Oleic acid | 0.5 part |
| Methyl ethyl ketone | 8 parts |
| Cyclohexanone | 40 parts |
| Magnetic Layer Composition (II) | |
| Abrasive: Alumina (AKP 12, produced by Sumitomo Chemical Co., Ltd.) | 5 parts |
| Carbon black (#975, produced by Columbian Co., Ltd.) | 1 part |
| Polyurethane Resin | 3 parts |
| Methyl ethyl ketone | 20 parts |
| Magnetic Layer Composition (III) | |
| Polyisocyanate (C3040, produced by Nippon Polyurethane Co., Ltd.) | 8 parts |
| Lubricant: | |
| Stearic acid dibutylamide | 1 part |
| Isotridecyl stearate | 2 parts |
| Methyl ethyl ketone | 200 parts |

The magnetic coating composition was, after adjustment of viscosity, coated on a 7 $\mu$m thick non-magnetic support of polyethylene naphthalate or polyethylene terephthalate shown in Table 1 in a dry thickness of 3.0 $\mu$m, and dried while subjecting to magnetic field orientation in the running direction by the use of 3,000 gauss opposing magnets. Then the magnetic layer was continuously subjected to calendering treatment, the opposite surface of the non-magnetic support provided with the magnetic layer was coated with the following backing layer in a thickness of 0.5 $\mu$m, and after slitting to 0.5 inch, the magnetic layer was subjected to surface treatment by the use of a diamond blade to produce a tape.

| Backing Layer Composition (I) | |
|---|---|
| Carbon black | 100 parts |

-continued

| | |
|---|---|
| (BP 800, produced by Cabot Corp.) | |
| Nitrocellulose (produced by Daicell Co., Ltd.) | 30 parts |
| Polyurethane polycarbonate (FJ2, produced by Dainichi Seika Co., Ltd.) | 45 parts |
| Phenoxy resin (PKHH, produced by Union Carbide Corp.) | 20 parts |
| Methyl ethyl ketone | 300 parts |
| Backing Layer Composition (II) | |
| Polyisocyanate (C3040, produced by Nippon Polyurethane Co., Ltd.) | 20 parts |
| Abrasive: α-Al$_2$O$_3$ (Hit 100, produced by Sumitomo Chemical Co., Ltd.) | 0.1 part |
| Lubricant: Silicone oil (KF 69, produced by Shin-etsu Chemical Industry Co., Ltd.) | 0.1 part |
| Copper oleate | 0.1 part |
| Methyl ethyl ketone | 700 parts |

This tape was mounted in an MII format cassette in a length of 250 m.

TABLE 1

| | Support | Young's modulus MD/TD | Ra of magnetic layer (nm) | Total thickness (μm) | C/N (dB) | Output smoothness (%) |
|---|---|---|---|---|---|---|
| Example 1 | PEN | 750/750 | 4.2 | 10.5 | +1.8 | 90 |
| Comparative Example 1 | PEN | 1,200/600 | 3.9 | 10.5 | +0.8 | 77 |
| Comparative Example 2 | PET | 750/600 | 3.9 | 10.5 | +0.4 | 82 |
| Comparative Example 3 | PET | 650/650 | 4.5 | 10.5 | +0.7 | 75 |

Output: MII-Pal VTR at 7 MHz

The output smoothness is calculated from the following equation:

$$\frac{(Max - Min)}{2} / 100$$

wherein

Max is the maximum output and Min is the minimum output in the output.

Ra: Center line average roughness, cut-off value: 0.25 mm

As can be seen from the results of Table 1, the sample using PEN of the present invention produced C/N which was about twice that in the use of PET, and an output smoothness which was about 20% larger that in the use of PET. On the other hand, in the same using PET, C/N was low, and the output smoothness was as low as about 75%. Even if PEN was used, no satisfactory results could be obtained when there was used the conventional PEN which was strongly oriented in the longitudinal direction.

While the invention has been described in detail and with reference to specific examples thereof, it will be apparent to one skilled in the art that various changes and modifications can be made therein without departing from the spirit and scope thereof.

What is claimed is:

1. A magnetic recording medium for use in a digital recording system comprising a non-magnetic support having thereon a magnetic layer containing a ferromagnetic powder and a binder, said non-magnetic support comprising polyethylene naphthalate in which Young's Modulus in the transverse direction is at least 700 to 900 kg/mm$^2$ and Young's Modulus in the longitudinal direction is from 600 to less than 800 kg/mm$^2$, the ferromagnetic powder being magnetic metal powder, and the total thickness of said magnetic recording medium being not more than 11 μm and wherein the coercive force (Hc) and maximum magnetic flux density (Bm) of said magnetic recording medium are at least 1400 and at least 3,000 gauss, respectively, and wherein a short wave recording wavelength of said magnetic recording medium is not more than 0.8 μm.

2. A magnetic recording medium as claimed in claim 1, wherein the thickness and central line average surface roughness (Ra) of said non-magnetic support are in a range of 5 to 9 μm and less than 12 nm, respectively.

3. A magnetic recording medium as claimed in claim 1, wherein said medium further comprises a backing layer.

4. A magnetic recording medium as claimed in claim 1, wherein a central line average surface roughness (Ra) of said magnetic layer is not more than 11 nm.

5. A magnetic recording medium as claimed in claim 1, wherein the squareness ratio (SQ) of said magnetic recording medium is 0.87 or more.

* * * * *

UNITED STATES PATENT AND TRADEMARK OFFICE
CERTIFICATE OF CORRECTION

PATENT NO. : 5,196,265
DATED : March 23, 1993
INVENTOR(S) : Katsumi Ryoke, et al It is certified that error appears in the above-indentified patent and that said Letters Patent is hereby corrected as shown below:

Col. 12, line 25, after "1400", insert --Oe--.

Signed and Sealed this

Twelfth Day of April, 1994

*Attest:*

BRUCE LEHMAN

*Commissioner of Patents and Trademarks*

*Attesting Officer*